United States Patent
Song

(10) Patent No.: US 12,105,197 B2
(45) Date of Patent: Oct. 1, 2024

(54) REAL-TIME DENOISE AND SATURATION REMOVAL OF 3D LIDAR DATA

(71) Applicant: Liturex (Guangzhou) Co. Ltd, Guangzhou (CN)

(72) Inventor: Yunpeng Song, San Ramon, CA (US)

(73) Assignee: Liturex (Guangzhou) Co. Ltd., Guangzhou (CN)

( * ) Notice: Subject to any disclaimer, the term of this patent is extended or adjusted under 35 U.S.C. 154(b) by 940 days.

(21) Appl. No.: 17/144,119

(22) Filed: Jan. 7, 2021

(65) Prior Publication Data

US 2021/0208277 A1 Jul. 8, 2021

Related U.S. Application Data

(60) Provisional application No. 62/958,235, filed on Jan. 7, 2020.

(51) Int. Cl.
| | |
|---|---|
| G01S 17/32 | (2020.01) |
| G01S 7/484 | (2006.01) |
| G01S 17/04 | (2020.01) |
| G01S 17/89 | (2020.01) |

(52) U.S. Cl.
CPC .............. *G01S 17/32* (2013.01); *G01S 7/484* (2013.01); *G01S 17/04* (2020.01); *G01S 17/89* (2013.01)

(58) Field of Classification Search
None
See application file for complete search history.

(56) References Cited

U.S. PATENT DOCUMENTS

| | | | | |
|---|---|---|---|---|
| 2005/0269481 | A1* | 12/2005 | David | G02B 27/01 250/208.1 |
| 2010/0128109 | A1* | 5/2010 | Banks | H04N 13/296 348/46 |
| 2010/0209013 | A1* | 8/2010 | Minear | G06T 7/32 382/294 |
| 2019/0391270 | A1* | 12/2019 | Uehara | G01S 17/04 |
| 2021/0124046 | A1* | 4/2021 | Satoh | G01S 17/894 |
| 2021/0341586 | A1* | 11/2021 | Holleczek | G01N 21/55 |

* cited by examiner

*Primary Examiner* — Eric L Bolda
(74) *Attorney, Agent, or Firm* — Davis Wright Tremaine LLP

(57) ABSTRACT

A method includes acquiring range data and intensity data of a first image frame captured at a high illumination, the first image frame including an image of a high-reflectivity object and a low-reflectivity object, the image of the high-reflectivity object being saturated; acquiring range data intensity data of a second image frame captured at a reduced illumination, the second image frame including an image of the high-reflectivity object, with the low-reflectivity object being invisible; and identifying a saturation region on the first image frame. The method further includes performing a cross-correlation operation between the identified saturation region and a corresponding region on the second image frame to identify a region in the saturation region, the identified region corresponding to an expected size of the high-reflectivity object on the first image frame; and replacing the identified region in the saturation region with a corresponding region in the second image frame.

18 Claims, 11 Drawing Sheets

REAL-TIME DENOISE AND SATURATION REMOVAL OF 3D LIDAR DATA

CLAIM OF PRIORITY

This application claims the benefit of priority to U.S. Provisional Application No. 62/958,235, titled "HIGH DYNAMIC RANGE LIDAR", filed Jan. 7, 2020, which application is herein incorporated by reference in its entirety.

TECHNICAL FIELD

Embodiments of the present invention relate generally to remote sensing, and more particularly relate to a method of multiple exposures of the same scene and combining multiple image frames to increase the dynamic range of an imaging device such as a light detection and ranging (LiDAR) device.

BACKGROUND

A LiDAR device can measure distances to objects in an environment by illuminating the objects with laser pulses and measuring reflected pulses from the objects. LiDAR devices typically utilizes high-grade optics and a rotating assembly to create a wide field of view, but such implementation tends to be bulky and costly. Solid-state Lidar sensors tend to be less costly but still may have large dimensions.

As in a camera, high reflectivity objects may saturate LiDAR detectors. The saturation can cause a high-reflectivity object to appear larger than it is supposed to be and can prevent the LiDAR device from identifying low-reflectivity objects in proximity with the high-reflectivity object.

The problem can be solved using gain control in mechanical LiDAR devices with analog photodetectors, whose gains can be controlled by adjusting the sensitivity of the photodetectors. However, gain control is ineffective for LiDAR devices that use single-photon avalanche diodes (SPADs) in their photodetectors, since SPADs are purely digital in nature, which makes gain control impractical.

SUMMARY

Described herein methods of combining image frames of different exposures to increase the dynamic range of an imaging device. An exemplary method includes acquiring range data and intensity data of a first image frame captured at a high illumination, the first image frame including an image of a high-reflectivity object and a low-reflectivity object, the image of the high-reflectivity object being saturated; acquiring range data intensity data of a second image frame captured at a reduced illumination, the second image frame including an image of the high-reflectivity object, with the low-reflectivity object being invisible; and identifying a saturation region on the first image frame. The method further includes performing a cross-correlation operation between the identified saturation region and a corresponding region on the second image frame to identify a region in the saturation region, the identified region corresponding to an expected size of the high-reflectivity object on the first image frame; and replacing the identified region in the saturation region with a corresponding region in the second image frame.

BRIEF DESCRIPTION OF THE DRAWINGS

Embodiments of the disclosure are illustrated by way of example and not limitation in the figures of the accompanying drawings, in which like references indicate similar elements.

DETAILED DESCRIPTION

Figure 1:
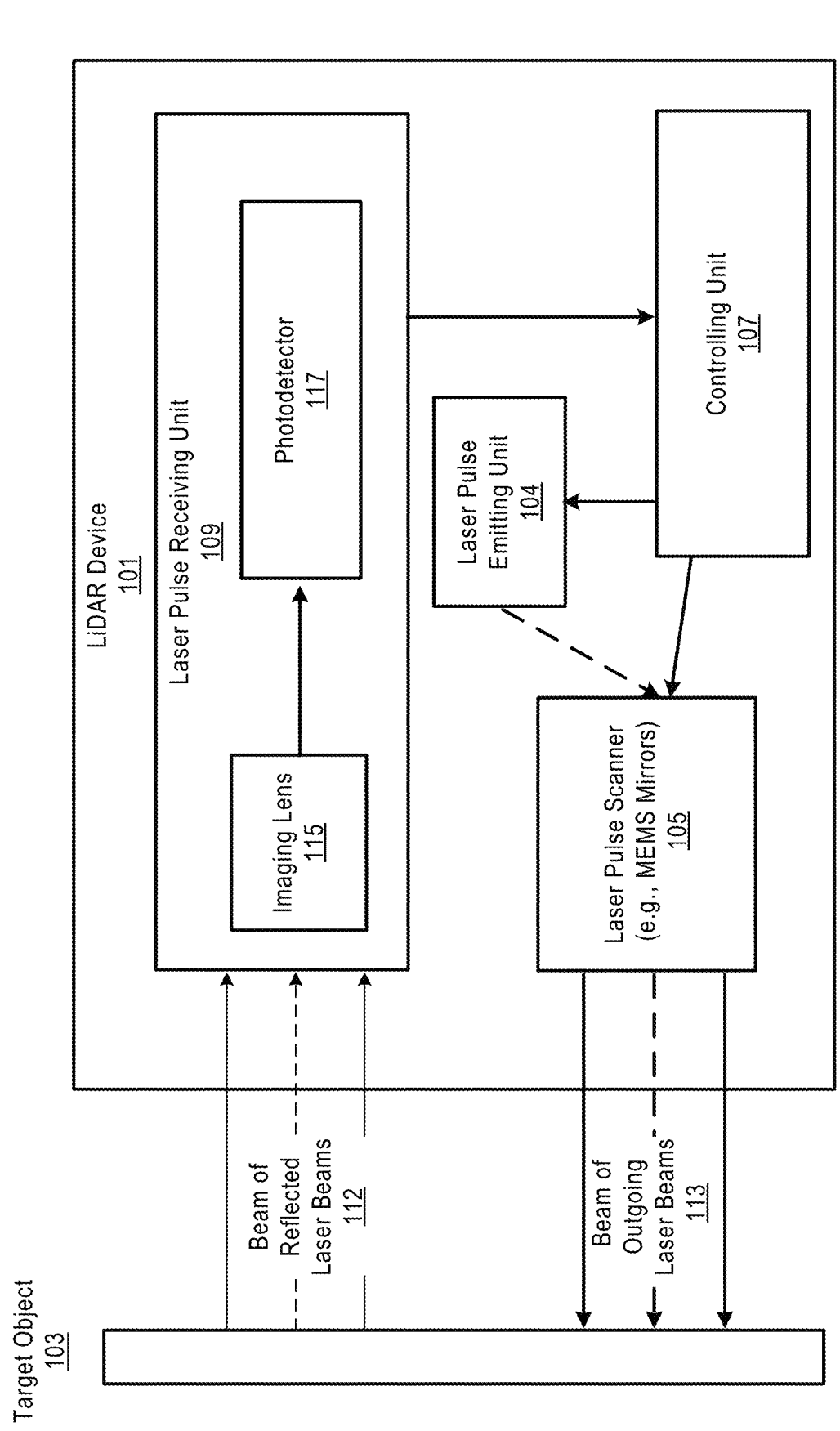
FIG. 1 illustrates an example of a LiDAR device in which embodiments of the invention can be implemented in accordance with an embodiment.

The following description and drawings are illustrative and are not to be construed as limiting. Numerous specific details are described to provide a thorough understanding of various embodiments. However, in certain instances, well-known or conventional details are not described in order to provide a concise discussion of the embodiments.

As described above, high-reflectivity objects can cause saturations in a photodetector of a LiDAR device, resulting in distorted images. For example, the dimensions of a saturated image may appear larger than it is supported to be, and may even overshadow a low-reflectivity object in close proximity in the same scene.

To address the issues described above, systems and methods are provided to capture objects with different levels of reflectivity. In one embodiment, the LiDAR device can sequentially illuminate a scene with a high-reflectivity object and a low-reflectivity using laser pulses that differ by one or more orders of magnitude. The LiDAR device can use cross-correlation to combine the image frame with one or more image frames that each are captured at a reduced illumination to obtain a composite image frame. The composite image frame can show both the high-reflectivity object and the low-reflectivity object at their expected size with an increased dynamic range. The dynamic range of the LiDAR device is a range of light intensities that the LiDAR device is capable of capturing.

According to a first aspect, a method of increasing a dynamic range of LiDAR device includes the operations of emitting a high illumination towards a scene at a first time, the scene including a high-reflectivity object and a low-reflectivity object; emitting a reduced illumination towards the scene at a second time; detecting a saturation region on a first image frame captured at the high illumination; and in response to detecting the saturation region, combining the first image frame captured at the high illumination, and a second image frame captured at the reduced illumination.

The high illumination and the reduced illumination are emitted in a quick succession. For example, there can be a time interval of three or four micro seconds between the emitting of the high illumination and the emitting of the reduced illumination.

In one embodiment, the intensity of the high illumination is a multiple of the intensity of the reduced illumination. In one example, the intensity of the high illumination can be one or more orders of magnitude stronger than the intensity of the reduced illumination, such that an image of the high-reflectivity object on the first image frame is saturated, with an image of the low-reflectivity object on the first image frame at its expected size; and that an image of the high-reflectivity object on the second image frame is at its expected size, with an image of the low-reflectivity object on the second image frame invisible.

In one embodiment, combining the first image frame and the second image frame includes replacing a portion of the image of the high-reflectivity object on the first image frame with the image of the high-reflectivity object on the second frame.

In one embodiment, prior to the detecting of a saturation region on a first image frame, emitting one or more additional reduced illuminations towards the scene; and after combining the first image frame and the second image to obtain a composite image frame, combining the composite image frame with an image frame captured at each of the one or more reduced illumination.

In one embodiment, the LiDAR device is configured to read a speed of a hosting object on which the LiDAR device is mounted, and delay the emitting of a next high illumination for a period of time based on the speed of the hosting object.

According to a second aspect, an imaging algorithm is described to combine image frames of different exposures to increase the dynamic range of LiDAR) device.

In one embodiment, an exemplary method includes acquiring range data and intensity data of a first image frame captured at a high illumination, the first image frame including an image of a high-reflectivity object and a low-reflectivity object, the image of the high-reflectivity object being saturated; acquiring range data intensity data of a second image frame captured at a reduced illumination, the second image frame including an image of the high-reflectivity object, with the low-reflectivity object being invisible; and identifying a saturation region on the first image frame. The method further includes performing a cross-correlation operation between the identified saturation region and a corresponding region on the second image frame to identify a region in the saturation region, the identified region corresponding to an expected size of the high-reflectivity object on the first image frame; and replacing the identified region in the saturation region with a corresponding region in the second image frame.

In one embodiment, after the replacing of the identified region in the saturation region, a gradient step is taken with respect to intensity data and range data related to the corresponding region to denoise the corresponding region. Further, prior to the replacing of the identified region in the saturation region, a gradient step is taken with respect to intensity data and range data related to the identified region to denoise the identified region in the saturation region.

In one embodiment, according to the exemplary method, one or more cross-correlation operations can be performed to update the remainder of the saturation region with a corresponding region of the second image frame. After each cross-correlation, a gradient step can be taken with respect to intensity data and range data related to the remainder of the saturation region to denoise the updated remainder of the saturation region. The gradient step with respect to the range data is to fit a continuous and smooth surface to data points defined by the range data.

In one embodiment, the method further includes performing an autocorrelation between the first image frame and another image frame captured at the high illumination after a period of delay to remove dark pixels from the first image frame. Replacing the identified region in the saturation region with a corresponding region in the second image frame further includes replacing intensity data and range data related to the identified region with range data and intensity data related to the corresponding region in the second image frame.

A sequence of the operations of a method in the embodiments of the present invention may be adjusted, and certain operations may also be combined or removed according to an actual requirement.

The embodiments described herein can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory. The embodiments can also be practiced as systems.

The above summary does not include an exhaustive list of all embodiments in this disclosure. All systems and methods can be practiced from all suitable combinations of the various aspects and embodiments described in the disclosure.

Solid State LiDAR Device

FIG. 1 illustrates an example of a LiDAR device 101 in which embodiments of the invention can be implemented in accordance with an embodiment.

The LiDAR device 101 can be a solid state LiDAR device 101, which can measure distances to objects in an environment by illuminating the objects with laser pulses (laser beams). Differences in return times of the reflected laser pulses and wavelengths can be used to create a point cloud of the environment. The point cloud can provide spatial location and depth information, for use in identifying and tracking the objects.

As shown in FIG. 1, the LiDAR device 101 can include a laser pulse emitting unit 104, a laser pulse scanner 105, a laser pulse receiving unit 109, and a controlling unit 107. The laser pulse emitting unit 104 can include one or more laser emitters that emit beams of short pulses of laser light including photons of various frequencies. The laser pulse emitting unit can emit laser spots or linear laser beams. In some embodiment, a diffuser can be used to increase the size of laser spots, including changing the shape of the laser spots into laser beams.

In one embodiment, the laser pulse emitting unit 104 can project linear laser beams. In this embodiment, the laser pulse emitting unit 104 uses a number of fast axis collimators (FACs) to collimate laser beams from a laser source array, a cylinder lens array for converting the collimated laser beams to parallel laser beams, and a prism array pair for reducing the pitch of the parallel laser beams. The laser pulse emitting unit 104 can further includes a first cylinder lens for focusing the laser beams from the prism array pair onto a MEMS mirror, which redirects the laser beams as a linear laser beam towards a predetermined direction.

For example, in FIG. 1, the laser pulse emitting unit 104 emits outgoing laser beams 113. The beam of outgoing laser beams 113 can be steered or scanned by the laser pulse scanner 105 in one or more directions using a variety of mechanisms, including microelectromechanical system (MEMS) mirrors, and one or more optical phased arrays (OPA). Each of the one or more directions is referred to as a steering direction or a scanning direction. A vertical angle and a horizontal angle associated with each steering direction is referred to as a steering angle or a scanning angle respectively. The laser pulse scanner 105 can steer one or more beams of laser pulses in a steering direction. Each beam of laser pulses can have a fixed number of pulses.

The controlling unit 107 can include control logic implemented in hardware, software, firmware, or a combination thereof. The controlling logic 107 can drive the other units or subsystems 104, 105 and 109 of the LiDAR device 101 in a coordinated manner, and can execute one or more data processing algorithms to perform one or more operations for signal filtering, object detections, and imaging processing. For example, the controlling unit 107 can synchronize the laser pulse emitting unit 104 and the laser pulse scanner 105 so that the scanner pulse scanner 105 can scan a horizontal field of view in multiple lines or at a particular direction.

The laser light receiving unit 109 can collect one or more beams of laser beams (e.g., laser beams 112) reflected from a target object 103 using one or more imaging lens (e.g., imaging lens 115), and focus the beams of laser pulses a photodetector 117, which can include multiple high-sensitivity photodiodes. The photodetectors can convert photons in the reflected laser pulses into electricity, and send returned signals incident on the photodetector 117 to the controlling unit 107 for processing.

In one embodiment, laser diodes in the laser pulse emitting unit 104 can operate in a pulsed mode with a pulse repeating at a fixed interval (e.g., every few micro-seconds). The laser diodes and laser drive circuits for providing appropriate bias and modulation currents for the laser diodes can be chosen according to predetermined performance parameters of the LiDAR device 101. Examples of the performance parameters can include a required maximum range of scanned space and resolution.

High Dynamic Range LiDAR Device

Figure 2:
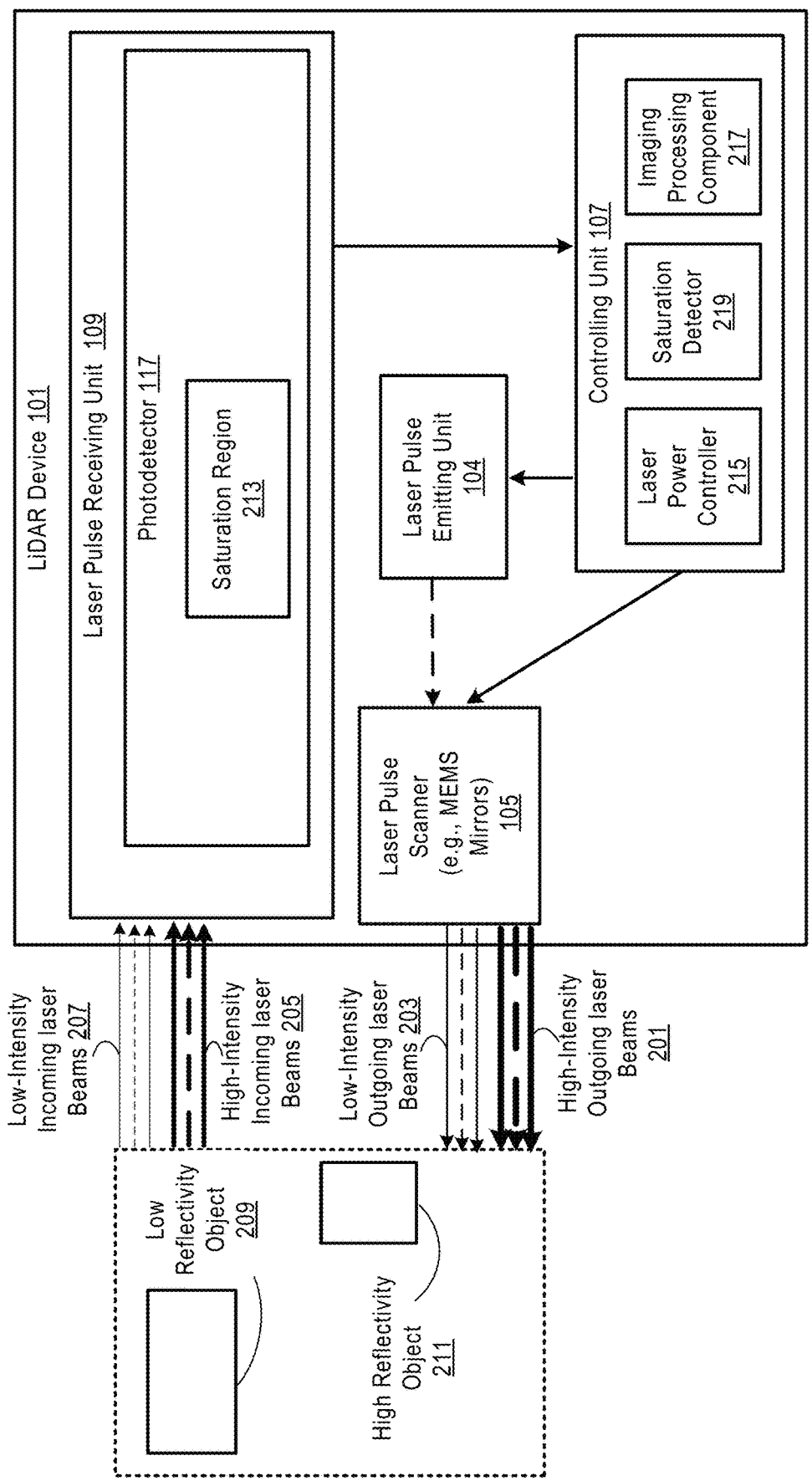
FIG. 2 further illustrates the LiDAR device in accordance with an embodiment.

FIG. 2 further illustrates the LiDAR device 101 in accordance with an embodiment. In this embodiment, the controlling unit 107 can further include a laser power controller 215, an imaging processing component 217, and a saturation detector 219.

The saturation detector 219 can be implemented in software, hardware, or firmware, and can detect saturation on the photodetector 117. The laser power controller 109 can send control commands to the laser pulse emitting unit 104 to emit laser beams 201 and 203 of different intensities. The imaging processing unit 111 can process images captured by the photodetector 117, including combing image frames captured at different times at illuminations of various intensities, and denoising the image frames. Such features of the imaging processing unit 111 can increase the dynamic range of the LiDAR device 101.

In one embodiment, the LiDAR device 101 can emit the laser high-intensity outgoing laser beams 210 towards a scene with a high-reflectivity object 211 and a low-reflectivity object 209. Examples of the high-reflectivity object include a roadway sign, and a construction safety equipment. Examples of the low-reflectivity object 209 include a tire on a road.

In one application scenario, an autonomous driving vehicle with the LiDAR device 101 mounted thereon travels in a particular environment, and encounters a roadway sign and black tire in close proximity to each other ahead of the vehicle. At the high-powered illumination (high illumination for short) 201, reflected laser beam 205 can cause saturation 213 on the photodetector 117 in a region corresponding to the high-reflectivity object 209.

In one embodiment, the saturation detector 219 can identify the saturation region 213 by comparing the number of SPADs in a macro-pixel and the photon count incident on the macro-pixel. For example, if each macro-pixel in the photodetector 117 includes 9 SPADs, and 30 photons are incident on a macro-pixel, the saturation detector 219 can determine that the macro-pixel is saturated.

The laser power controller 215 can be programmed to instruct the laser pulse emitting unit 104 to generate laser pulses of different intensities at different times to illuminate a scene. In one embodiment, as described above, the laser power controller 215 can instruct the laser pulse emitting unit 104 to generate a high illumination and one or more reduced illuminations regardless of the reflective properties of objects in the scene.

In another embodiment, the laser power controller 215 can instruct the laser emitting unit 104 to generate a reduced illumination (e.g., the low-intensity laser beams 203) only when saturation is detected on an image captured at a high illumination (e.g., the high-intensity laser beams 201).

In another embodiment, after a high-reflectivity object is detected based on the saturation resulting from the initial high illumination, the LiDAR device 101 may stop generating high illuminations for a period of time if it can be determined that the high-reflectivity object will continue to be in a particular range and in the field of view of the LiDAR device 101 for that period of time. Instead, the LiDAR device 101 only emits low illuminations for that period of time. The determination of the length of the time period can be based on a number of factors, including the speed of the hosting object on which the LiDAR device is mounted, the types of obstacles in the particular environment, and the distance of the high-reflectivity object when it was initially detected.

In one embodiment, the LIDAR device 101 can be configured to read the speed of the hosting object (e.g., an autonomous driving vehicle) measured by a speed sensor on the housing object. Alternatively, a speed sensor can be embedded into the LiDAR device to measure the speed of the LiDAR device itself.

The photodetector 117 can capture a first image frame from a high illumination and a second image frame from the reduced illumination. In the first image frame, the high-reflectivity object 211 is saturated, and appears larger than its expected size if the image frame was saturated; and the low-reflectivity object 209 appears at the expected size. In the second image frame, the high-reflectivity object 211 appears at its expected size because the corresponding macro-pixels are not saturated anymore due to the reduced illumination, while the low-reflectivity object 211 may be invisible due to the failure to record any photon in the corresponding macro-pixels on the photodetector 117.

The imaging processing component 217 can combine the two images frames using cross-correlation techniques to identity the expected location of an image of the high-reflectivity object 209 on the first image frame, and update that image with an image of the high-reflectivity object 209 on the second image frame. After the two image frames are combined, a composite image frame can be generated to include both the high-reflectivity object 209 and the low-reflectivity object 211 at their respective expected sizes.

Figure 3A:
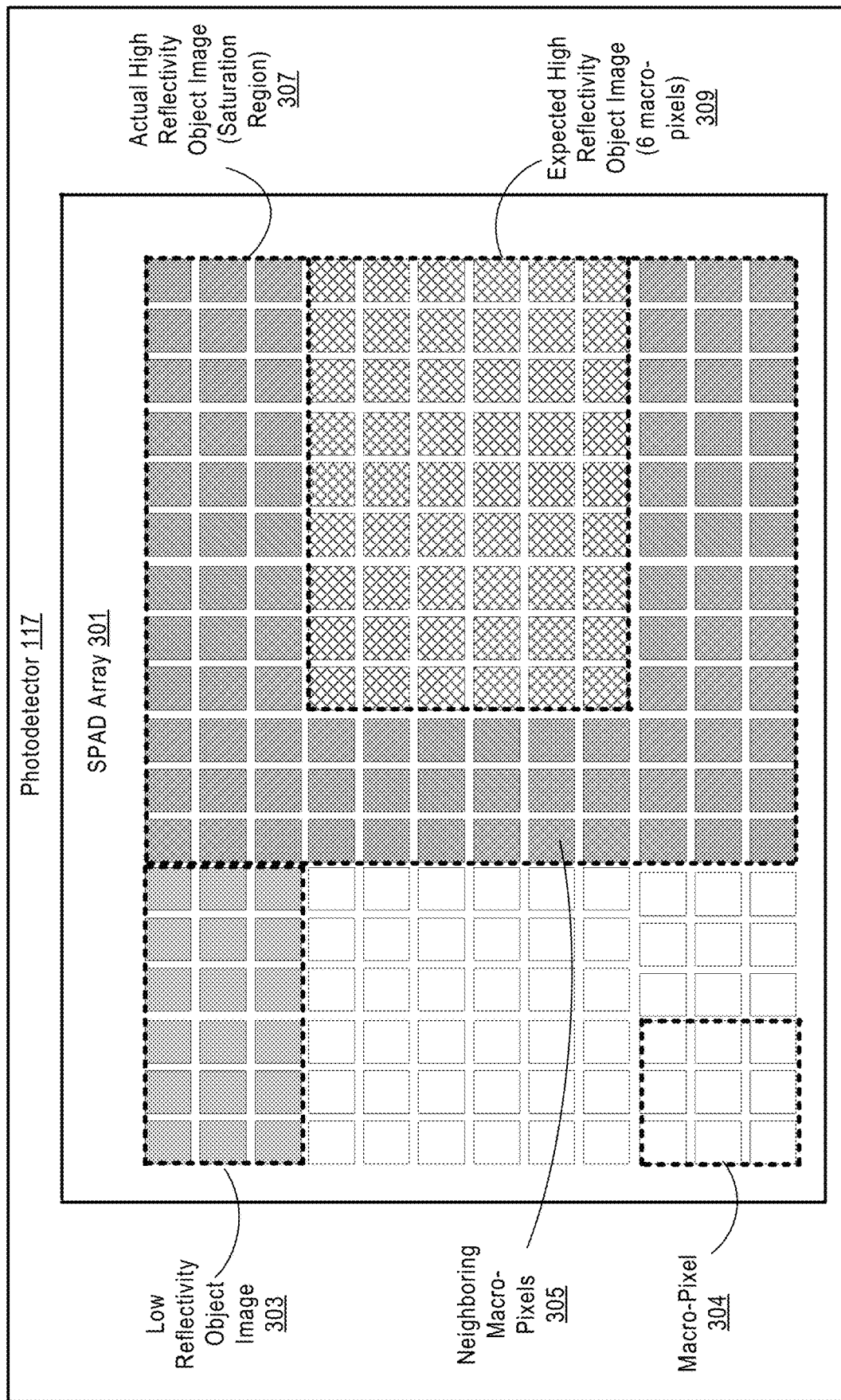
FIGS. 3A-3B illustrate the photodetector at a high illumination and a reduced illumination in accordance with an embodiment.
Figure 3B:
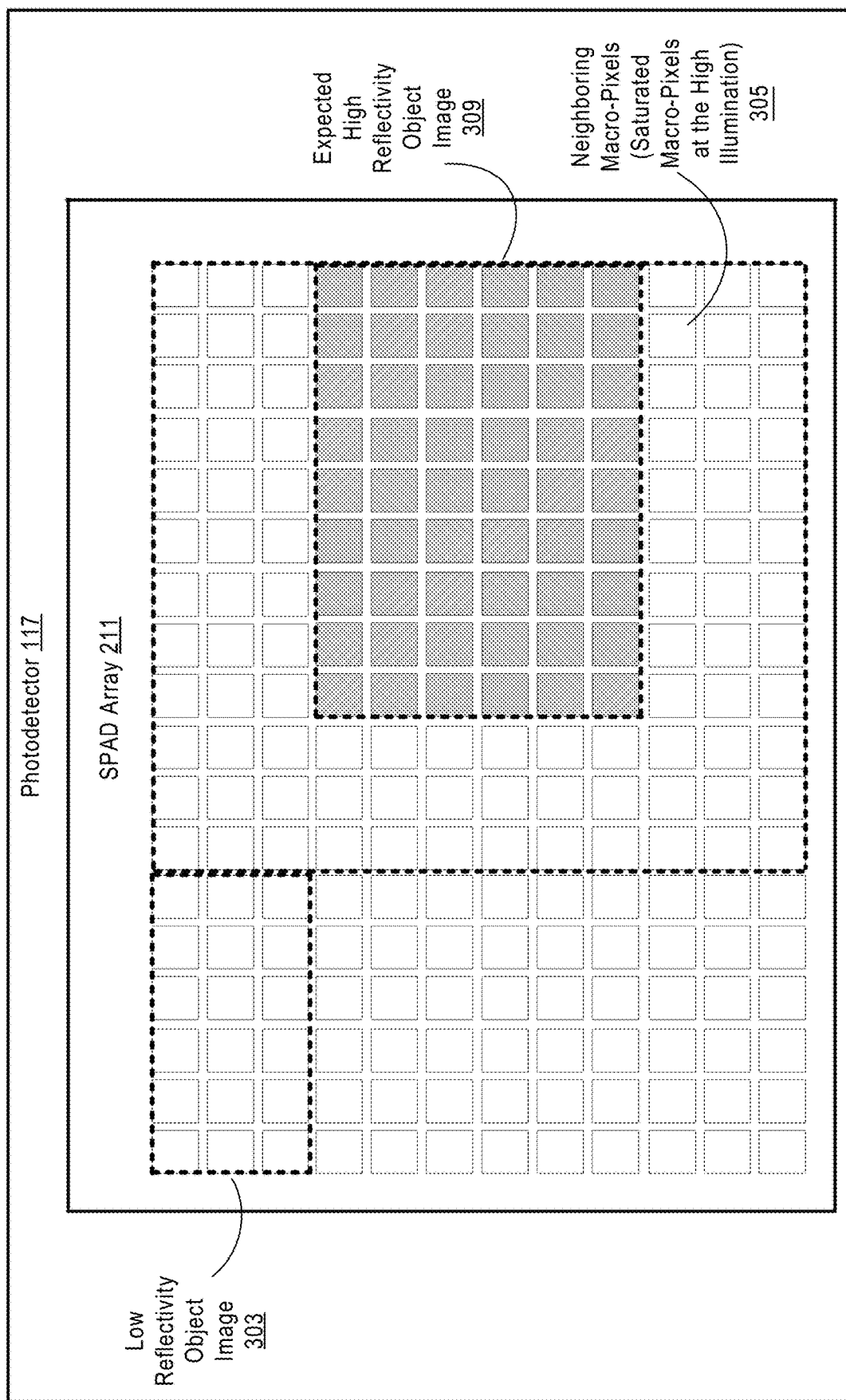

FIGS. 3A-3B illustrate the photodetector 117 at a high illumination and a reduced illumination in accordance with an embodiment.

In FIG. 3A illustrates macro-pixels triggered on the photodetector 117 due to the high illumination. As used in this disclosure and the disclosure of the provisional application from which this disclosure claims the benefit of priority, a macro-pixel is also referred to as a max pixel, and it is represented a fixed number of SPADs arranged into a mini SPAD array. An example of a macro-pixel 304 including 9 SPADs is shown in FIG. 3A. The photodetector 117 includes multiple macro-pixels similar to the macro-pixel 304, and the multiple macro-pixels form a larger SPAD array 301.

As shown in FIG. 3A, which shows the high illumination scenario, reflected laser beams from the low-reflectivity object 209 can trigger two macro-pixels, which form an unsaturated image 303 for the low-reflectivity object 209. However, reflected laser beams from the high-reflectivity object 211 can result in a saturation region corresponding to an actual image 307 for the high-reflectivity object 211. The actual image 307 include neighboring macro-pixels 305 and the 6 macro-pixels corresponding to the expected image 309 of the high-reflectivity object 211. The real image 307 is larger than the expected image 309 for the high-reflectivity object 209.

FIG. 3B illustrates macro-pixels triggered on the photodetector 117 at a reduced illumination. In one implementation, the high illumination can be generated by a 100-watts laser source (e.g., the laser emitting unit 104), and the reduced illumination can be generated by a 5-watts laser source.

Therefore, the photo count on each macro-pixel corresponding to the images 303 and 307 would be proportionally reduced to one-twentieth of the photo count on that macro-pixel at the high illumination. The photo count reduction would cause the low-reflectivity object 211 to be invisible on the SPAD array 301 due to the recording of 0 photon in the corresponding macro-pixels, and cause the high-reflectivity object to appear at its expected size due to the removal of saturation from the neighboring macro-pixels 305.

Figure 4:
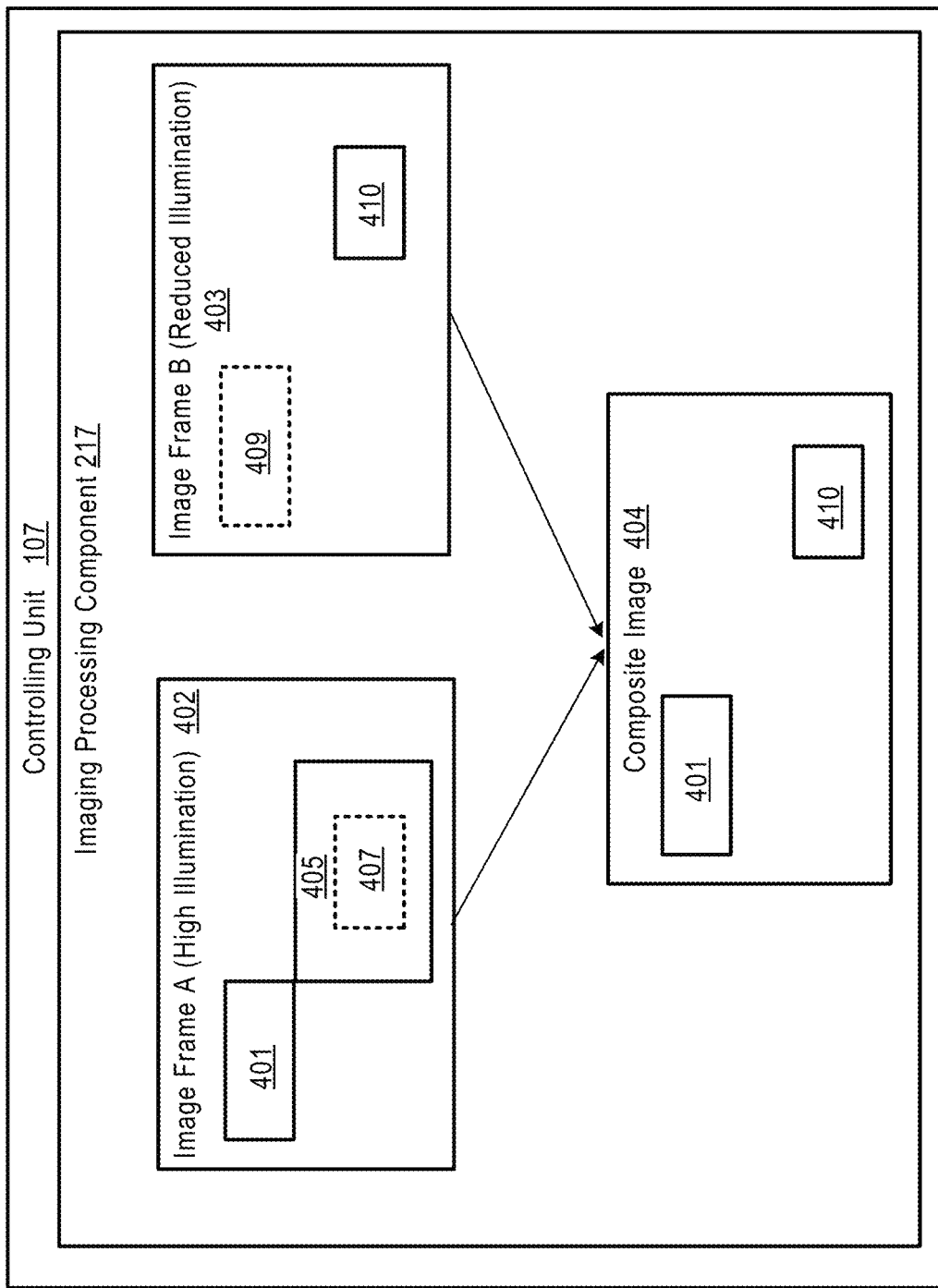
FIG. 4 illustrates how the imaging processing component 217 combines images captured at different illuminations in accordance with an embodiment.

FIG. 4 illustrates how the imaging processing component 217 combines images captured at different illuminations in accordance with an embodiment. As shown in FIG. 4, the imaging processing unit component 217 can obtain image frame A 402 captured at a high illumination and image frame B 403 captured under the reduced illumination.

Image frame A 402 include an image 401 for a low-reflectivity object at its expected size, and a saturated image 405 for a high-reflectivity object. The saturated image 405 is larger than the expected image 407 of the high-reflectivity object. The image frame B 409 does not show the low-reflectivity object at its expected location 409 because the reduced illumination cause each corresponding macro-pixel to record 0 photon. However, due to the reduced illumination, the high-reflectivity object would not cause saturation on the photodetector (e.g., the photodetector 117 in FIG. 3A and FIG. 3B), and therefore would appear at its expected size 410.

The imaging processing component 217 can combine the two image frames 402 and 403 using cross-correlation techniques and denoising techniques to obtain a composite image frame 404, which includes the image 401 from the image frame A 402 and the image 410 from the image frame B 403.

Figure 5A:
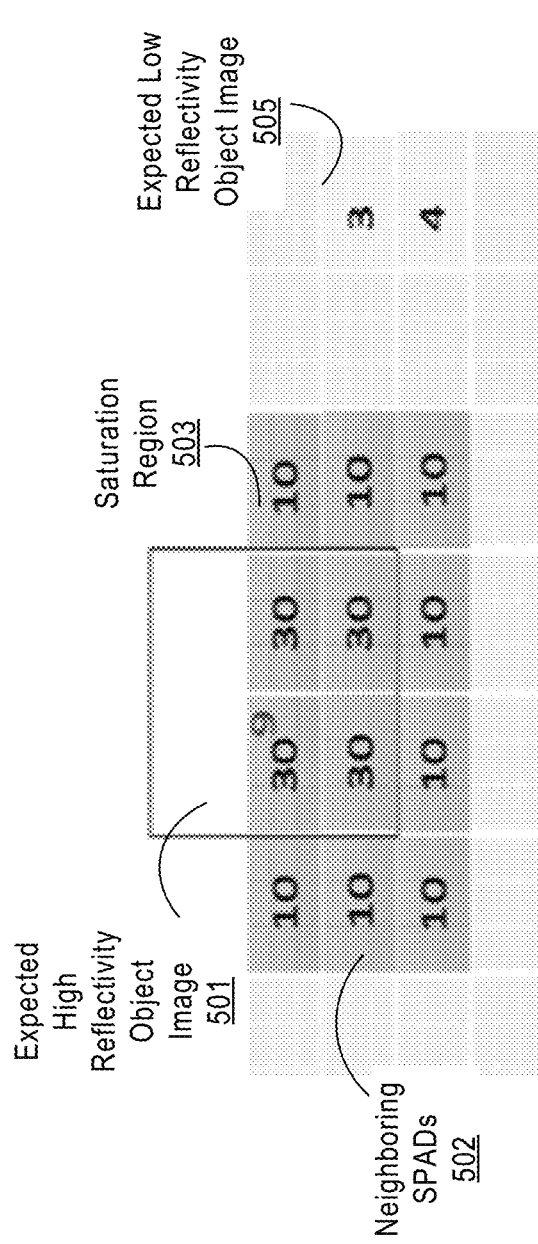
FIGS. 5A-5B illustrate examples of triggered macropixels under different illuminations in accordance with an embodiment.
Figure 5B:
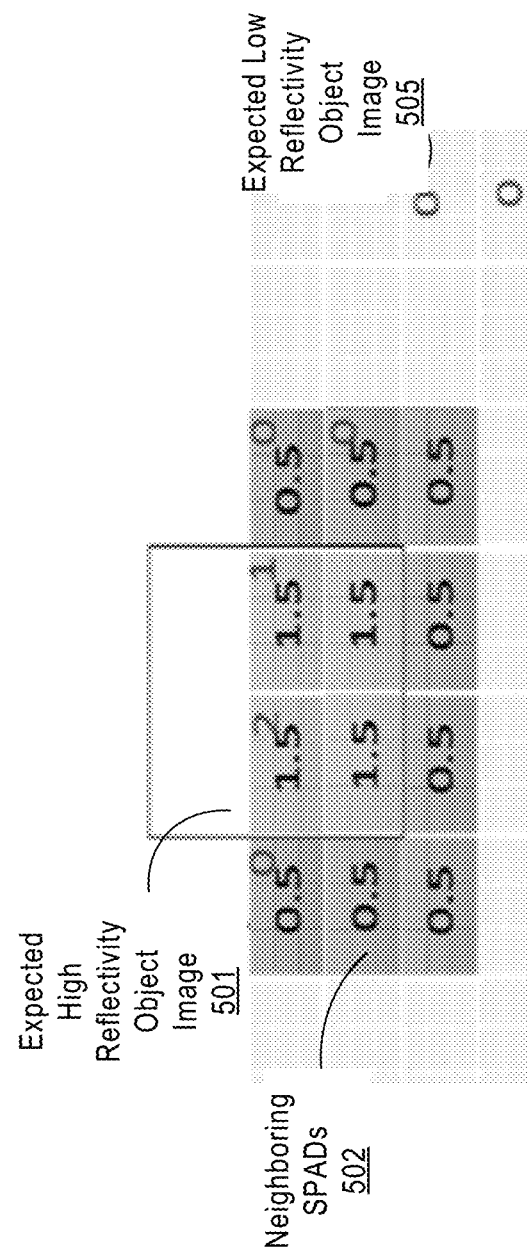

FIGS. 5A-5B illustrate examples of triggered macro-pixels under different illuminations in accordance with an embodiment.

FIG. 5A shows triggered macro-pixels under the high illumination (100 watts laser beams). Reflected laser beams from a high-reflectivity object cause 12 macro-pixels 503 to be saturated. The saturation region 503 includes the macro-pixels (each showing a photo count of 30) corresponding to an expected high-reflectivity object image and one or more neighboring SPADs 502 (photon counts not shown). In FIG. 5A, each numerical number on a macro-pixel represents the number of photons that the macro-pixel receives under the high illumination. Since each macro-pixel includes 9 SPADs, the macro-pixel can register a maximum of 9 photons from the high illumination, and any photon exceeding the number of 9 may be disregarded.

As a result, the image of the high-reflectivity object appears larger than the expected image 501. Reflected laser beams from a low-reflectivity object trigger two macro-pixels 505 to register 3 photons and 4 photons respectively. Therefore, the low-reflectivity object appears at its expected size.

In FIG. 5B, under the reduced illumination (5 watts laser beams), the photo count on each of the macro-pixels corresponding to the expected image 501 of the high-reflectivity object is reduced to 1.5 in theory (but in reality, either 1 or 2 photons will be registered). Each macro-pixel in the rest of the previously saturated region receives 0.5 photon in theory (in reality, either 0 or 1 photon is registered). The two macro-pixels corresponding to the image 505 of the low-reflectivity will register 0 photon, causing the image 505 to be invisible.

After the two image frames from FIG. 5A and FIG. 5B are combined, the image 505 and the image 501 will be shown on the composite image frame.

Figure 6:
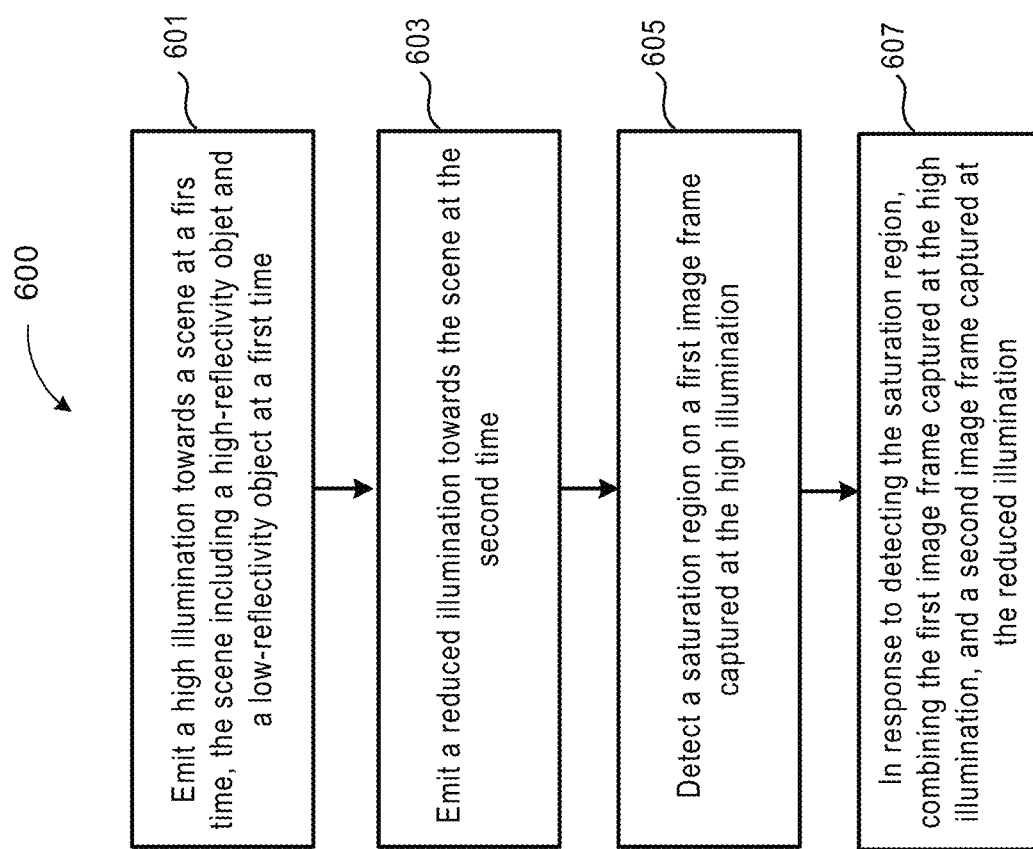
FIG. 6 is a process illustrating a method of increasing a dynamic range of a LiDAR device in accordance with an embodiment.

FIG. 6 is a process 600 illustrating a method of increasing a dynamic range of a LiDAR device in accordance with an embodiment. Process 600 may be performed by processing logic which may include software, hardware, firmware, or a combination thereof. For example, process 600 may be performed by the controlling unit 107 described in FIG. 1.

In operation 601, the processing logic sends a signal or command to cause the laser pulses emitting unit of the LiDAR device to emit a high illumination towards a scene at a first time, the scene including a high-reflectivity object and a low-reflectivity object at a first time. In operation 603, the processing logic sends a signal or command to cause the laser pulse emitting unit to emit a reduced illumination towards the scene at the second time. In operation 605, the processing logic detects a saturation region on a first image frame captured at the high illumination. In operation 605, the processing logic combines the first image frame captured at the high illumination, and a second image frame captured at the reduced illumination in response to detecting the saturation region.

Image Combination

As described above, the LiDAR device 101 can capture multiple image frames for a scene using illuminations of different intensities. The initial illumination can be a high-powered illumination with the intensity of each subsequent illumination being reduced, for example, by one or more orders of magnitude. The multiple frames can be combined into a composite image frame.

Figure 7:
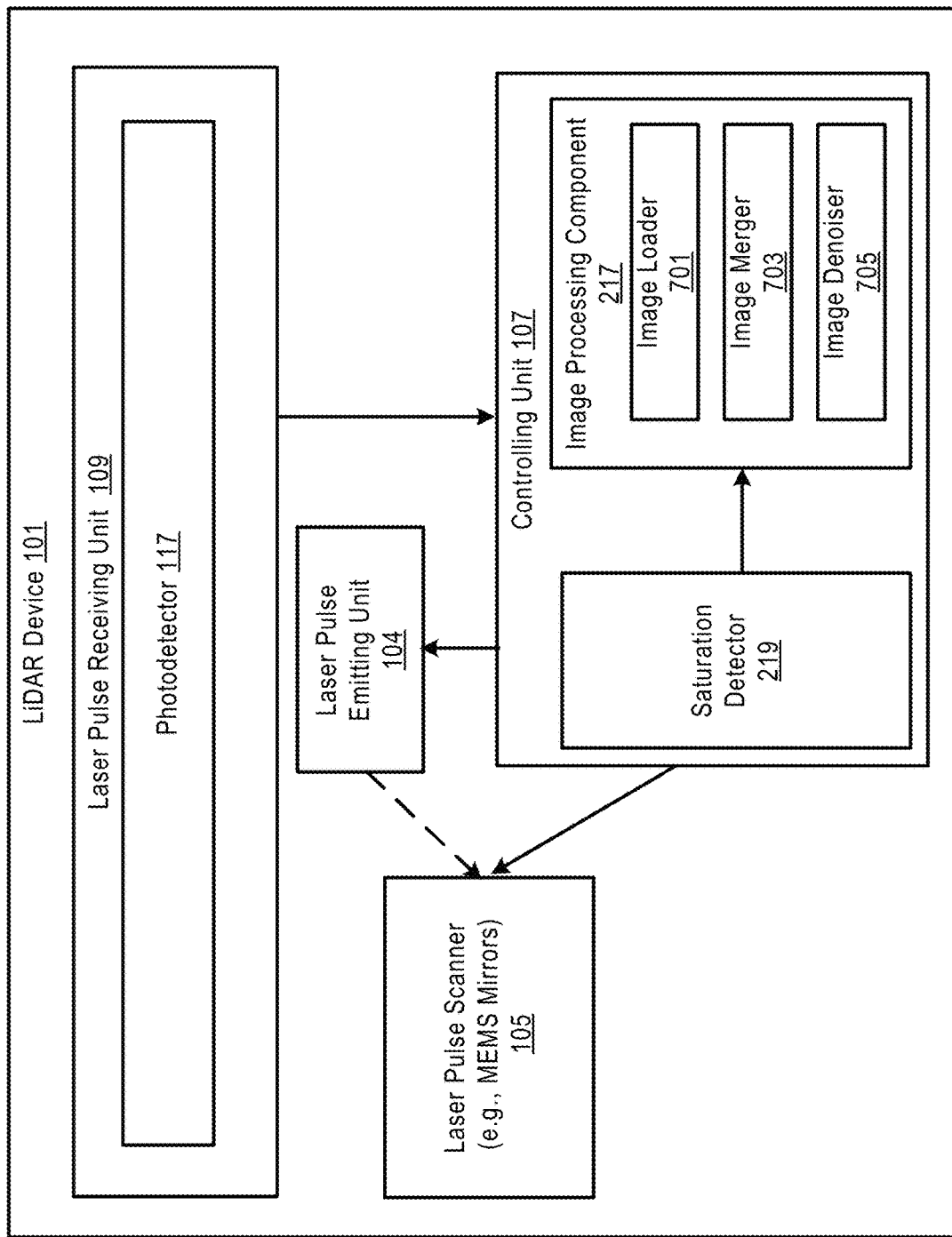
FIG. 7 illustrates a system for combing different image frames captured at illuminations of different intensities in accordance with an embodiment.

FIG. 7 illustrates a system for combing different image frames captured at illuminations of different intensities in accordance with an embodiment. As shown in FIG. 7, the imaging processing component 217 includes an image loader 701, an image merger 703, and an image denoiser 705.

In one embodiment, for each scene, the LiDAR device 101 can emit at least two illuminations, with the first illumination having a largest intensity, and each subsequent illumination with a decreasing intensity. In this disclosure, two illuminations are used to illustrate the various embodiments described herein. In one example implementation, the first illumination can be 100 watts, and the second illumination can be 5 watts.

The imaging processing component 217 can load a first image frame captured at the first illumination and a second image frame captured at the second illumination using an image loader 701. For each image frame, the image loader 7-1 can load range data and intensity data of the image frame. The imager loader 701 can call the saturation detector 219, which can search for saturation in the intensity data of the first image frame based a comparison between a photon count on each macro-pixel on the photodetector 117 and a preconfigured threshold (e.g., number of SPADs in a macro-pixel). If a saturation is found, the image loader 701 can call the image merger 803 to combine the two image frames.

In one embodiment, the image merger 703 can use cross-correlation techniques to identify saturation area on the first image frame, and replace the saturation region with a corresponding image from the second image frame. The image denoiser 705 can denoise range data and intensity data of the combined image frame using gradient steps.

Figure 8:
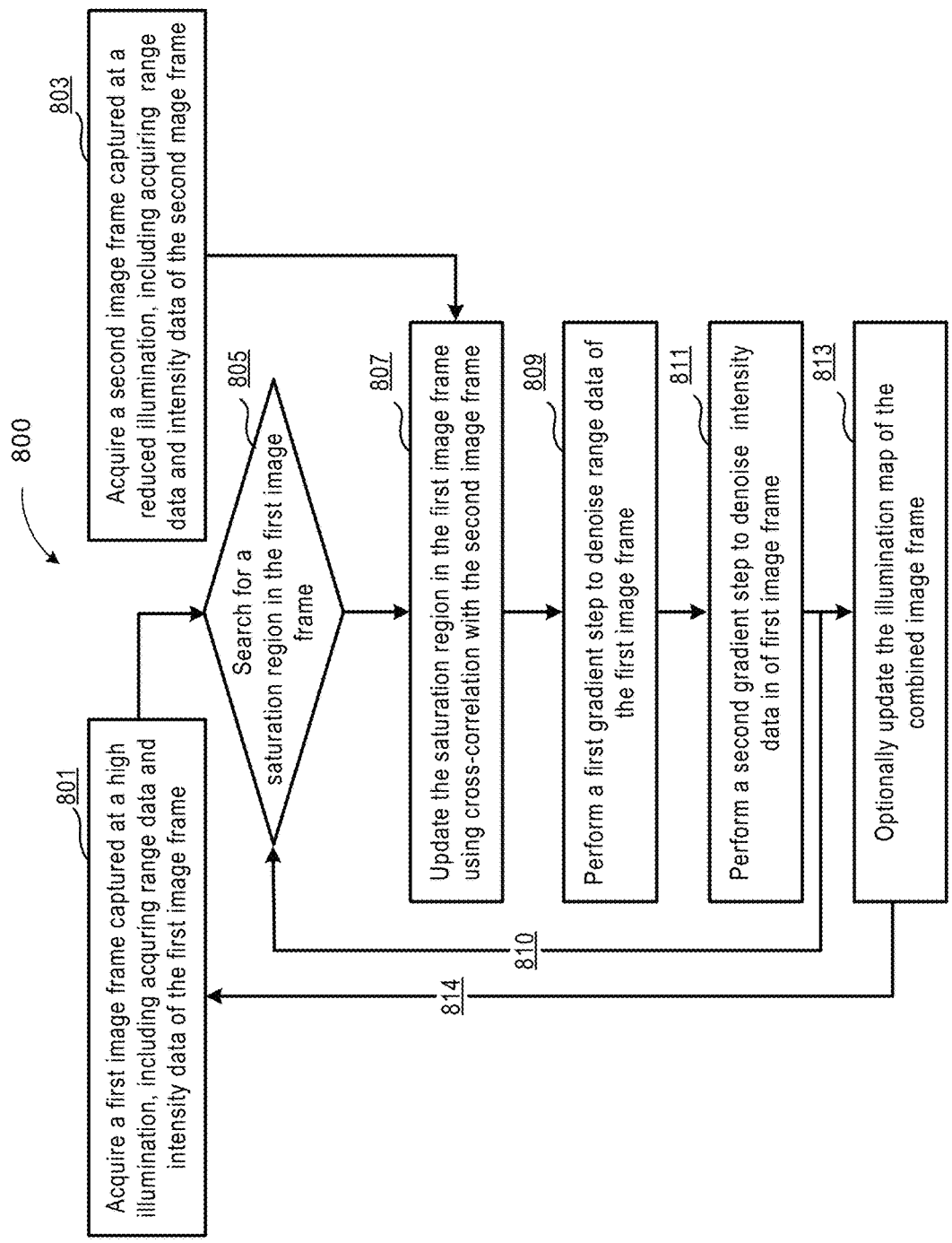
FIG. 8 illustrates a process of combing image frames captured at illuminations of different intensities in accordance with an embodiment.

FIG. 8 illustrates a process 800 of combing image frames captured at illuminations of different intensities in accordance with an embodiment. Process 800 may be performed by processing logic which may include software, hardware, firmware, or a combination thereof. For example, process 800 may be performed by the controlling unit 107 as described in FIG. 1.

As shown in FIG. 8, in operation 801, the processing logic loads a first image frame captured at a high illumination, including acquiring intensity data and range data of the first image frame. The first image frame includes an image of a high reflectivity object and an image of a low reflectivity object. The image of the high-reflectivity object is saturated and appears larger than it is expected to be when the image is not saturated.

In operation 803, the processing logic loads a second image frame captured at a reduced illumination, including acquiring intensity data and range data of the second image frame. The intensity of the reduced illumination can be one or more orders of magnitude less than the intensity of the high illumination, or the intensity of the reduced illumination can be a tiny fraction of the intensity of the high illumination. The ration between the two illuminations can be configurable. For example, the intensity of the reduced illumination can be one-twentieth of the intensity of the high illumination. The second image frame includes an image of the high-reflectivity object at its expected size due to the absence of saturation. The low-reflectivity object is invisible on the second image frame.

As used herein, an image frame is a point cloud that contains intensity data that measures the strength of laser beams, and range data that describes a position (e.g., XYZ coordinates) of each LiDAR data point in the point cloud. The strength of the laser beams can be represented by the number of photons incident on a macro-pixel when the laser beams are incident on the macro-pixel. As also used herein, capturing an image frame at an illumination means the image frame is captured when part of the illumination is reflected back and incident on the photodetector (e.g., the photodetector 117 in FIG. 1).

In operation 805, the processing logic searches for a saturation region on the first image frame based on the intensity data of the image frame. For example, the processing logic can determine that one or more macro-pixels are saturated by based on photon counts on the macro-pixels. If the photon counts in a macro-pixel reaches or exceeds the number of SPDAs in the macro-pixel, that macro-pixel is saturated.

In operation 807, the processing logic identifies the saturation region, and updates the identified saturation region with the image of the high-reflectivity object on the second image frame using cross-correction. Cross-correlation techniques can be used to track movements of the intensity data and range data on both image frames, compare the movements, and determine how well the movements match each other and at point they best match. A cross-correlation operation is to be conducted only between the two images of the high-reflectivity object on the two image frames based their intensity data and range data. A cross-correlation operation is not to be performed between the two images of the low-reflectivity object on the two image frames, since neither image is saturated. The processing logic only performs cross-correlation if one of the images is saturated, and neither image of the low-reflectivity object is saturated in this embodiment.

After the cross-correlation operation, an area corresponding to the image of the high-reflectivity object on the second image can be identified from the saturation region in the first image frame. The identified area in the saturation region can be replaced by the image of the high-reflectivity object from the second image frame.

In operation 809, the processing logic performs a gradient step to denoise the range data of the first image frame. Gradient in this operation is a directional change in the range data of the first image frame. The gradient step can be taken with respect to the range data of the first image frame. In the gradient step, the point cloud representing the first image frame can be denoised using the algebraic point set surfaces (APSS) algorithm, which fits a smooth continuous surface to the set of points defined by the range data.

In operation 811, the processing performs a gradient step to denoise the intensity data on the first image frame. Gradient in this operation is a directional change in the intensity data. The gradient step is to identify whether a data point is an isolated point. If a point is a part of the scene, the gradient would be small because a physical object typically does not change rapidly. A random data point without neighboring data points tends to have a high gradient. The gradient step is performed to remove the random data points with high gradients.

The above operations 805-811 can be repeated 810 multiple times to obtain a clear image of the high-reflectivity object on the first image frame. The end result of operations 805-811 after multiple iterations is a composite image frame that includes the image of the low-reflectivity object at its expected size, and an image of the high-reflectivity object at its expected size. Further, the two gradient steps can be performed in parallel to improve the performance of the LiDAR device.

In operation 813, the illumination map (i.e. illumination intensity of outgoing laser beams) can be optionally updated to avoid over-saturation if it can be determined that the scene including the high-reflectivity object and the low-reflectivity object is not to change in a subsequent period of time.

Figure 9B:
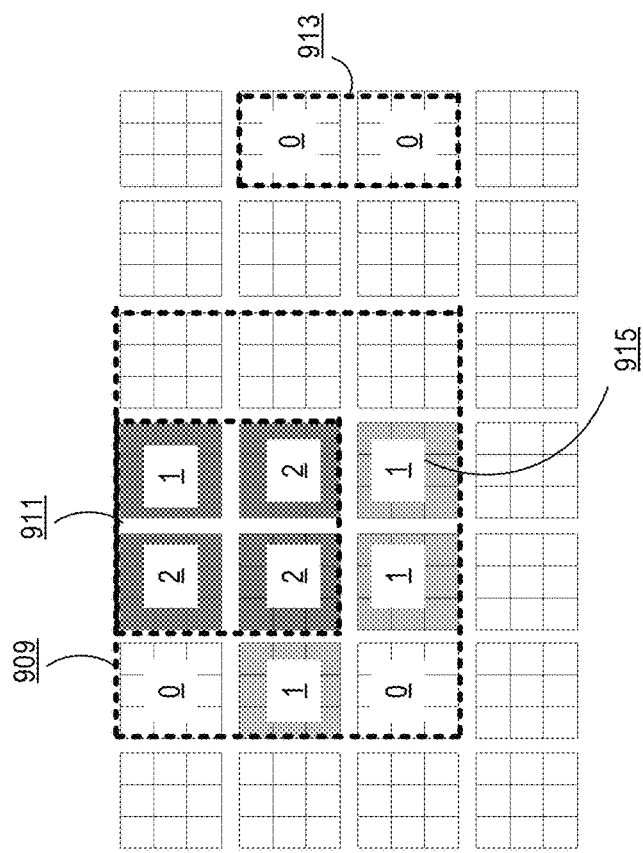
FIGS. 9A-9B illustrate an example of obtaining a composite image frame in accordance with an embodiment.
Figure 9A:
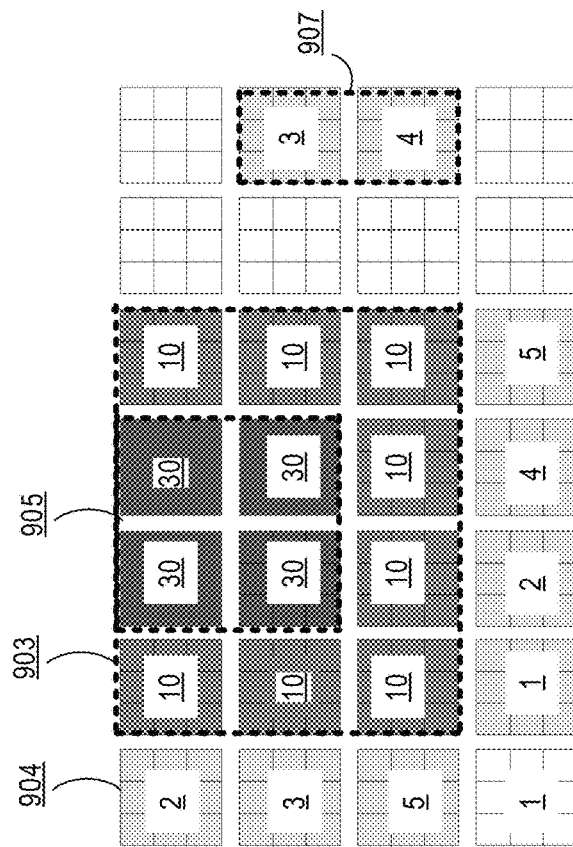

FIGS. 9A-9B illustrate an example of obtaining a composite image frame in accordance with an embodiment. The figures show image frames of a high-reflectivity object and a low-reflectivity object captured from a 4×7 macro-pixel array on a photodetector. The number in the center of each macro-pixel is a photon count on that macro-pixel at each illumination.

FIG. 9A shows a high illumination scenario, where a saturation region 903 represents the actual image size of a high-reflectivity object, and a region 905 within the saturation region 903 represents the expected image size of the high-reflectivity object. As shown, the actual image size is larger than the expected image size due to saturation. A region 907 is an actual image size of the low-reflectivity object. FIG. 9A also includes some pixels (i.e. the macro-pixels showing photon counts ranging from 1 to 5) 904 neighboring the actual image of the high-reflectivity object. These macro-pixels register photos due to the saturation of the actual image of the high-reflectivity object, and they are not part of the actual image of the high-reflectivity object.

FIG. 9B shows a reduced illumination scenario. In this example, the intensity of the reduced illumination is one-twentieth of the intensity of the high illumination. The image of the low-reflectivity 913 is invisible due to 0 photo counts being registered as a result of the reduced illumination. The intensity of the reduced illumination is one-twentieth of the intensity of the high illumination. The dark pixel area 906 mostly receives 0 photon at the reduced illumination. Each of the 4 macro-pixels 911 in the previously saturated region 909 receives 2 photons or 1 photon, and each of the rest of the macro-pixels in the previously saturated region 909 receives either 0 photon or 1 photon. At the reduced illumination, the expected image 911 of the high-reflectivity object is the same size of the actual image, both corresponding to the 4 macro-pixels, which are not saturated anymore at the reduced illumination.

After obtaining the range data and intensity data of both image frames, the imaging processing component can first check whether if a saturation region can be found on the image frame captured at the high illumination. Because in this example a saturation region is on the image frame, the imaging processing component can perform a cross-correlation between the actual image of the high-reflectivity object captured at the high illumination and the corresponding area of the image captured at the reduced illumination.

During the first iteration of the multiple-iteration recursive process, the imaging processing component can search for the saturation region 903 on the high illumination image frame shown in FIG. 9A, and then perform a cross-correlation between the region 903 and the corresponding region 909 on the reduced illumination image frame shown in FIG. 9B. Through the cross-correlation, the imaging processing component can identify that the region 905 corresponds to the expected size of the high-reflectivity object.

Before replacing the region 905 with the corresponding region 911 from the reduced illumination image fame, a gradient step can be taken with respect to the intensity data to denoise the intensity data related to the region 905. For example, noises in intensity data may happen when the region 905 does not have a photo count of 30 in each and every macro-pixel (This noise macro-pixel is not shown in FIG. 9A). The gradient step can remove the noise macro-pixel such that the precise region that needs to be replaced can be determined.

After the denoising, the imaging processing component can replace the region 905 with corresponding are 911. After the replacing, a gradient step with respect to the range data related to the region can be taken to fit a smooth and continuous surface to the data points defined the range data.

During the second iteration of the multi-iteration recursive process, the imaging processing component can continue search for saturation in the high illumination image frame, and then perform another cross-correlation between the remainder of the saturation region 903 (i.e. macro-pixels with photon counts of 10) and the corresponding region in the reduced illumination image frame. After the correlation, the remainder of the saturation 903 region can be updated with photon counts on the corresponding macro-pixels. As a result, the remainder of the saturation region 903 may end up with photon counts of 0 or 1. A macro-pixel with a photo count of 1 is a noise pixel and needs to be removed through a denoising step.

The recursive process can terminate after a predetermined of iterations (e.g., 3) or when all the saturation region has been updated.

In one embodiment, the imaging processing component may need to perform an auto correlation to remove the dark pixels 904 from the high illumination image frame, as the low illumination image frame does not have dark pixels and therefore the dark pixels cannot be removed through cross-correlation. An autocorrelation is a correlation of a series of signals with a delayed copy of themselves as a function of delay. In this embodiment, an autocorrelation can be performed between the high illumination image frame and another image frame captured at the high illumination after a period of delay. With the delay, the scene may have changed, and the original high-reflectivity object may not be there to cause dark pixels on the photodetector. Therefore, such an autocorrelation may remove the dark pixels on the first high illumination image frame.

Figure 10:
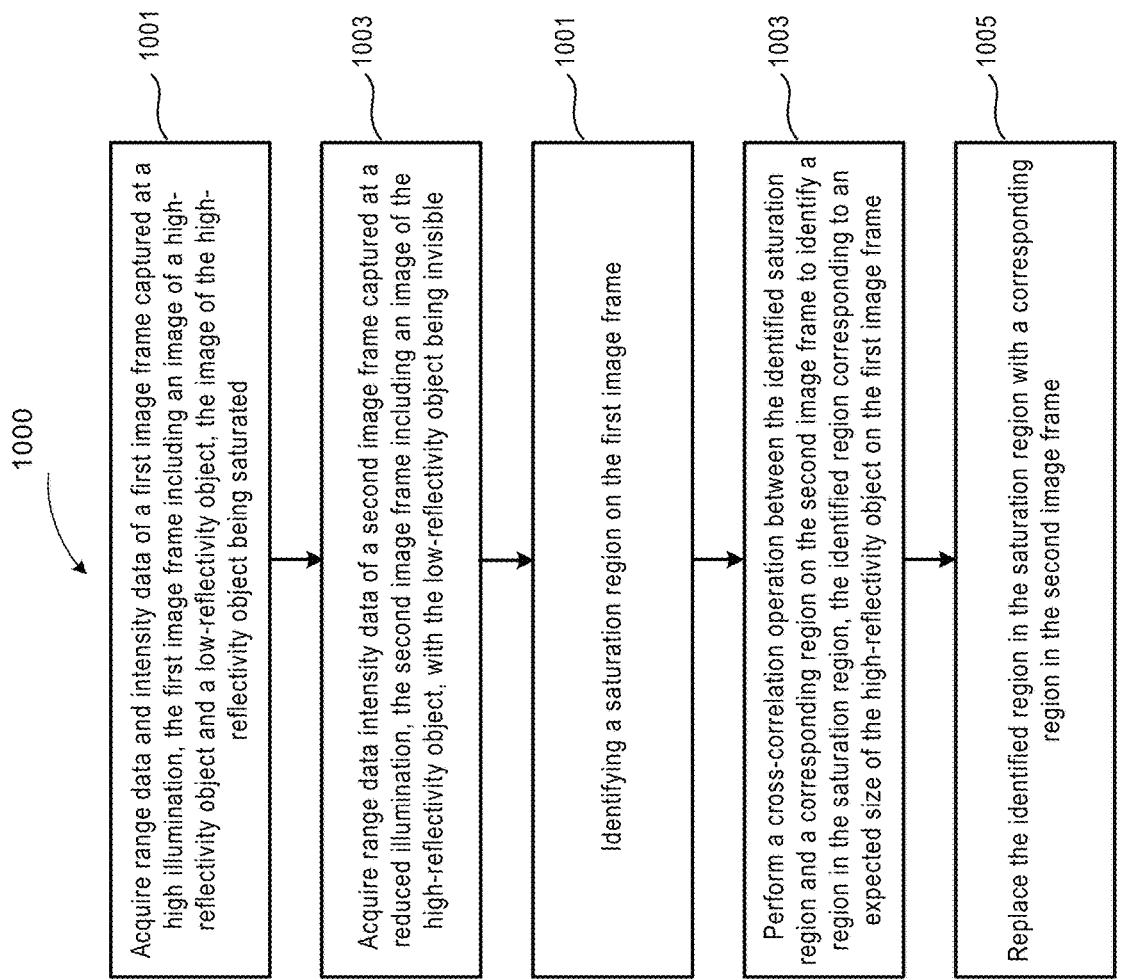
FIG. 10 is a process illustrating a method of increasing a dynamic range of a LiDAR device in accordance with an embodiment.

FIG. 10 is a process 1000 illustrating a method of increasing a dynamic range of a LiDAR device in accordance with an embodiment. Process 1000 may be performed by processing logic which may include software, hardware, firmware, or a combination thereof. For example, process 1000 may be performed by the controlling unit 107 described in FIG. 1.

In operation 1001, the processing logic acquires range data and intensity data of a first image frame captured at a high illumination, the first image frame including an image of a high-reflectivity object and a low-reflectivity object, the image of the high-reflectivity object being saturated. In operation 1003, the processing logic acquires range data intensity data of a second image frame captured at a reduced illumination, the second image frame including an image of the high-reflectivity object, with the low-reflectivity object being invisible. In operation 1005, the processing logic identifies a saturation region on the first image frame. In operation 1007, the processing logic performs a cross-correlation operation between the identified saturation region and a corresponding region on the second image frame to identify a region in the saturation region, the identified region corresponding to an expected size of the high-reflectivity object on the first image frame. In operation 1009, the processing logic replaces the identified region in the saturation region with a corresponding region in the second image frame.

Some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application.

Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of increasing a dynamic range of a light detection and ranging (LiDAR) device, comprising:
   acquiring a first image frame captured at a high illumination, the first image frame including an image of a high-reflectivity object and a low-reflectivity object, the image of the high-reflectivity object being saturated;
   acquiring a second image frame captured at a reduced illumination, the second image frame including an image of the high-reflectivity object, with the low-reflectivity object being invisible;
   identifying a saturation region on the first image frame;
   performing a cross-correlation operation between the identified saturation region and a corresponding region on the second image frame to identify a region in the saturation region;
   replacing the identified region in the saturation region with a corresponding region in the second image frame;
   performing one or more cross-correlation operations to update the remainder of the saturation region with a corresponding region of the second image frame; and
   after each cross-correlation, performing a gradient step with respect to intensity data and range data related to the remainder of the saturation region to denoise the updated remainder of the saturation region.

2. The method of claim 1, further comprising:
   after the replacing of the identified region in the saturation region, performing a gradient step with respect to intensity data and range data related to the corresponding region to denoise the corresponding region of the second image frame.

3. The method of claim 1, further comprising:
   prior to the replacing of the identified region in the saturation region, performing a gradient step with respect to intensity data and range data related to the identified region to denoise the identified region in the saturation region.

4. The method of claim 1, wherein the gradient step with respect to the range data is to fit a continuous and smooth surface to data points defined by the range data.

5. The method of claim 1, further comprising:
   performing an autocorrelation between the first image frame and another image frame captured at the high illumination after a period of delay to remove dark pixels from the first image frame.

6. The method of claim 1, wherein replacing the identified region in the saturation region with a corresponding region in the second image frame further includes replacing intensity data and range data related to the identified region with range data and intensity data related to the corresponding region in the second image frame.

7. The method of claim 1, wherein each of the first image frame and the second image frame is a point cloud.

8. An electronic circuit configured to perform the operations comprising:
   acquiring range data and intensity data of a first image frame captured at a high illumination, the first image frame including an image of a high-reflectivity object and a low-reflectivity object, the image of the high-reflectivity object being saturated;
   acquiring range data and intensity data of a second image frame captured at a reduced illumination, the second image frame including an image of the high-reflectivity object, with the low-reflectivity object being invisible;
   identifying a saturation region on the first image frame;

performing a cross-correlation operation between the identified saturation region and a corresponding region on the second image frame to identify a region in the saturation region;

replacing the identified region in the saturation region with a corresponding region in the second image frame;

performing one or more cross-correlation operations to update the remainder of the saturation region with a corresponding region of the second image frame; and after each cross-correlation, performing a gradient step with respect to intensity data and range data related to the remainder of the saturation region to denoise the updated remainder of the saturation region.

9. The electronic circuit of claim 8, the operations further comprising:

after the replacing of the identified region in the saturation region, performing a gradient step with respect to intensity data and range data related to the corresponding region to denoise the corresponding region of the second image frame.

10. The electronic circuit of claim 8, the operations further comprising:

prior to the replacing of the identified region in the saturation region, performing a gradient step with respect to intensity data and range data related to the identified region to denoise the identified region in the saturation region.

11. The electronic circuit of claim 8, wherein the gradient step with respect to the range data is to fit a continuous and smooth surface to data points defined by the range data.

12. The electronic circuit of claim 8, the operations further comprising:

performing an autocorrelation between the first image frame and another image frame captured at the high illumination after a period of delay to remove dark pixels from the first image frame.

13. The electronic circuit of claim 8, wherein replacing the identified region in the saturation region with a corresponding region in the second image frame further includes replacing intensity data and range data related to the identified region with range data and intensity data related to the corresponding region in the second image frame.

14. The electronic circuit of claim 8, wherein each of the first image frame and the second image frame is a point cloud.

15. A method of increasing a dynamic range of a light detection and ranging (LiDAR) device, comprising:

acquiring a first image frame captured at a high illumination, the first image frame including an image of a high-reflectivity object and a low-reflectivity object, the image of the high-reflectivity object being saturated;

acquiring a second image frame captured at a reduced illumination, the second image frame including an image of the high-reflectivity object, with the low-reflectivity object being invisible;

identifying a saturation region on the first image frame;

performing a cross-correlation operation between the identified saturation region and a corresponding region on the second image frame to identify a region in the saturation region; and replacing the identified region in the saturation region with a corresponding region in the second image frame, wherein replacing the identified region in the saturation region with a corresponding region in the second image frame further includes replacing intensity data and range data related to the identified region with range data and intensity data related to the corresponding region in the second image frame.

16. The method of claim 15, further comprising:

after the replacing of the identified region in the saturation region, performing a gradient step with respect to intensity data and range data related to the corresponding region to denoise the corresponding region of the second image frame.

17. The method of claim 15, further comprising:

prior to the replacing of the identified region in the saturation region, performing a gradient step with respect to intensity data and range data related to the identified region to denoise the identified region in the saturation region.

18. The method of claim 15, wherein each of the first image frame and the second image frame is a point cloud.

* * * * *